United States Patent
Zhu et al.

(10) Patent No.: US 10,963,544 B2
(45) Date of Patent: Mar. 30, 2021

(54) AUTHENTICATION METHODS AND SYSTEMS USING INTERACTIVE THREE-DIMENSIONAL ENVIRONMENTS

(71) Applicants: Ye Zhu, Westlake, OH (US); Jonathan Gurary, South Euclid, OH (US)

(72) Inventors: Ye Zhu, Westlake, OH (US); Jonathan Gurary, South Euclid, OH (US)

(73) Assignee: Cleveland State University, Cleveland, OH (US)

( * ) Notice: Subject to any disclaimer, the term of this patent is extended or adjusted under 35 U.S.C. 154(b) by 0 days.

(21) Appl. No.: 15/944,340

(22) Filed: Apr. 3, 2018

(65) Prior Publication Data

US 2018/0285538 A1    Oct. 4, 2018

Related U.S. Application Data

(60) Provisional application No. 62/480,771, filed on Apr. 3, 2017.

(51) Int. Cl.
| | | |
|---|---|---|
| G06F 21/31 | (2013.01) | |
| G06T 19/00 | (2011.01) | |
| G06F 3/01 | (2006.01) | |
| G06F 21/36 | (2013.01) | |

(52) U.S. Cl.
CPC .............. *G06F 21/31* (2013.01); *G06F 3/011* (2013.01); *G06F 21/36* (2013.01); *G06T 19/003* (2013.01); *G06T 19/006* (2013.01)

(58) Field of Classification Search
None
See application file for complete search history.

(56) References Cited

U.S. PATENT DOCUMENTS

| | | | | |
|---|---|---|---|---|
| 2010/0073126 A1* | 3/2010 | Morin | ..................... | G06F 21/36 340/5.2 |
| 2013/0117704 A1* | 5/2013 | Lahoutifard | ........ | G06F 3/04815 715/780 |

* cited by examiner

*Primary Examiner* — Michelle Chin
(74) *Attorney, Agent, or Firm* — Renner, Kenner, Greive, Bobak, Taylor & Weber

(57) ABSTRACT

An authentication method and system, includes a display to present interactive three-dimensional (3D) virtual environments. The manner or sequence in which a user interacts with objects in the interactive 3D environment is used to form their passcode. The entered passcode is then compared with a previously stored or "set" passcode to determine whether the user is authenticated and permitted to access content controlled by the authentication process.

14 Claims, 3 Drawing Sheets

US 10,963,544 B2

AUTHENTICATION METHODS AND SYSTEMS USING INTERACTIVE THREE-DIMENSIONAL ENVIRONMENTS

CROSS-REFERENCE TO RELATED APPLICATION

This application claims the benefit of U.S. Provisional Application No. 62/480,771 filed Apr. 3, 2017, the contents of which are incorporated herein by reference.

STATEMENT REGARDING FEDERALLY SPONSORED RESEARCH OR DEVELOPMENT

This invention was made with government support under Contract Nos. 1338105 and 1343141 awarded by the Division of Computer Network Systems of the National Science Foundation (NSF). The government has certain rights in the invention.

TECHNICAL FIELD

Generally, the embodiments disclosed herein relate to authentication methods. Particularly, the embodiments disclosed herein relate to interactive authentication methods. More particularly, the embodiments disclosed herein relate to authentication methods and systems in which interactive three-dimensional environments are utilized.

BACKGROUND

Current authentication methods have largely relied on passwords, which are based on a user's knowledge of facts, information or secrets. In the case of alphanumeric passwords, they are susceptible to being easily forgotten or lost by a user, especially after a long period of time. In addition, traditional alphanumeric passwords can become so unwieldy in their length and complexity that it is impossible to memorize them, in addition to being frustrating to input. Furthermore, the sheer number of passwords that are needed to access various computing devices, such as smartphones, and various content/data, such as video content and banking data, makes the use of alphanumeric passwords cumbersome and tedious. Alphanumeric passwords also suffer from security issues, such as being susceptible to shoulder-surfing attacks in which third-party observers seek to identify the password by looking over the shoulder of the individual entering the password.

In order to overcome the drawbacks of alphanumeric passwords, graphical passwords have also been developed, as it was thought that visual data is easier to remember and recognize than alphanumeric characters or words formed therefrom. However, graphical passwords still suffer from many of the drawbacks of alphanumeric passwords, including that posed by shoulder-surfing attacks for example.

Thus, given the difficulty users have in remembering and using alphanumeric/graphical passwords, as well as the susceptibility such passwords have to security attacks, it would be desirable to have an authentication method that overcomes these deficiencies.

Therefore, there is a need for authentication methods and systems using interactive three-dimensional (3D) environments in which a passcode is based on a user's navigation and/or interaction within a 3D environment, which allows the resulting passcode to be: input with minimal time and effort, so as to have enhanced usability; readily remembered by the user, even after a long period of time, so as to have enhanced memorability; and difficult to guess or predict by third parties, so as to have enhanced security.

SUMMARY

In light of the foregoing, it is a first aspect of the various embodiments disclosed herein to provide an authentication method comprising displaying a three-dimensional (3D) virtual environment; interacting with the environment, such that the interaction defines an entered passcode; and determining whether the entered passcode is authenticated.

It is a further aspect of the various embodiments disclosed herein to provide a device for controlling access to content comprising means for displaying a three-dimensional (3D) virtual environment; means for interacting with the environment to form an entered passcode; and means for determining whether the entered passcode is authenticated to determine if access to content controlled by the device is permitted.

BRIEF DESCRIPTION OF THE DRAWINGS

These and other features and advantages of the various embodiments disclosed herein will become better understood with regard to the following description and accompanying drawings wherein.

DETAILED DESCRIPTION

Figure 1:
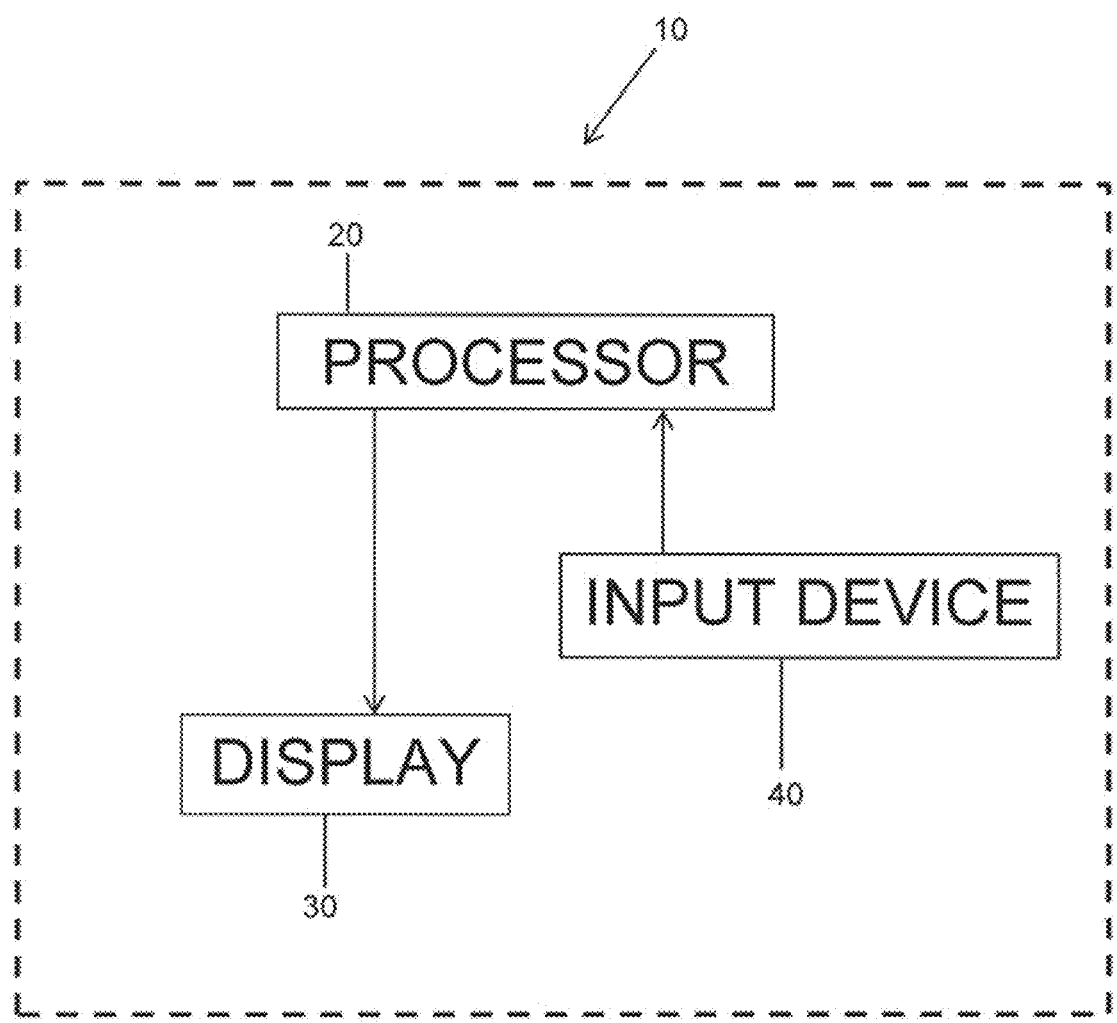
FIG. 1 is a block diagram of an input unit that is capable of executing an authentication method in accordance with the concepts of the various embodiments disclosed herein.

Various three-dimensional (3D) authentication methods and systems are presented herein. However, in order to facilitate the understanding of the reader, the discussion that follows presents the underlying psychological and physical principles upon which the various embodiments of the 3D authentication method are based to achieve enhanced levels of passcode memorability, usability and security.

With regard to the psychological principles leveraged by the 3D authentication method, the principle of "presence" is utilized. Presence is the psychological sense of "being in" or "existing in" a virtual or computer generated environment, and how well an individual's behavior in the virtual environment matches their behavior in similar circumstances in real life.

"Spatial memory" refers to that portion of an individual's memory that is used to navigate an environment and to remember where things are. It is neurologically distinct from other types of memory, such as the memory used for object recognition and factual recall. Thus, because the 3D authentication method requires the active participation of the user in a 3D environment, the user's spatial memory is utilized.

"Episodic memory" is the autobiographical memory of the experiences of a user, which is distinct from the fact-based, cognitive reference memory known as "semantic memory". Thus, episodic memory relates to an individual's recollection of events that they have personally experienced, while semantic memory relates to an individual's knowledge, such as language and math. Accordingly, the 3D authentication method utilizes a user's episodic memory.

"Context" relates to the fact that individuals remember more information when they are asked to recall that information in the same environment in which they learned it. Furthermore, context is tied closely to episodic memory, as temporal and spatial relationships between events can be a part of the remembrance of those events. In other words, to remember what a user did in the kitchen for example, may require the user to recall when they went there, and what occurred prior to the trip to the kitchen. As such, by leveraging these psychological principles, the 3D authentication method improves the memorability, usability and security of the passcode used by such method.

With regard to physical phenomena leveraged by the 3D authentication method, it is submitted that four depth cues, which are not used in traditional two-dimensional (2D) displays, including stereo parallax, motion parallax, convergence, and accommodation, are provided by 3D displays used by the 3D authentication method to be discussed.

"Stereo parallax" relates to the fact that because human eyes are spaced apart, each eye perceives a slightly different image. The difference between the two images is used as a depth cue. This effect is particularly useful in determining depth of nearby objects, where the difference between each eye's image is more substantial. With regard to displays, true stereo vision is available only in head mounted displays (HMDs), where each eye is shown a different image. However, glasses-enabled 3D (three-dimensional) displays and naked-eye 3D displays can also provide stereo vision.

With regard to "head tracking and motion parallax", some displays, primarily HMDs, have the ability to move on-screen images as the user moves their head. Far away objects appear to travel less distance than nearby objects when an image is moved due to turning of the head—a depth cue known as motion parallax. Deliberate movements of the head can be used to achieve accurate estimates of the distance of objects, thus motion parallax can be useful in applications where gauging distance is important. Head tracking also allows users to target objects by turning their head towards them, thus reducing the need for an input device for performing various aiming tasks.

With regard to "egocentric and exocentric approaches", the egocentric approach emulates a first-person point of view, while an exocentric view refers to the more familiar outside "camera-based" view or third-person point of view one typically sees in television and movies. As such, it has been found that the use of an egocentric approach (i.e. first person point of view) with an HMD leads to a higher level of "presence" than that of the exocentric approach. However, it should be appreciated that the 3D authentication method may utilize either of the egocentric or exocentric approaches.

As such, while "presence" of the user within the 3D virtual environment provided by the 3D authentication method is improved due to the addition of one or more of the depth cues in a 3D display, as discussed above, any suitable 3D display independent of the depth cues discussed may be used by the 3D authentication method. That is, any suitable three-dimensional (3D) display may be used by the 3D authentication method, which is capable of presenting a virtual 3D environment. Furthermore, in some embodiments, the 3D display may comprise a two-dimensional (2D) display in which the 3D virtual environment is rendered, such as by shading and/or perspective, thereby to appear to the user to be in three-dimensions (3D).

Thus, with the psychological and physical phenomena that are leveraged by the 3D authentication method used to achieve enhanced levels of "presence" or immersion of the user within the 3D virtual environment set forth, the following discussion relates to the implementation of the various embodiments of the three-dimensional (3D) authentication method.

The various embodiments of the 3D authentication method are capable of being executed on an input unit or system 10, as shown in FIG. 1, so as to form an authentication system. It should be appreciated that the input unit 10 includes a processor 20 that is in operative communication with a display 30 that is capable of displaying a three-dimensional (3D) virtual environment, also referred to herein as a 3D environment. In addition, an input device 40 is in operative communication with the processor 20 to allow a user to control an avatar, or other virtual icon, to navigate or move within the 3D environment presented on the display 20, and to interact with one or more items or objects that are placed within the 3D environment. As such, the particular navigation or movement of the avatar through the 3D environment combined with the particular interaction with the items/objects therein defines a passcode. Accordingly, if the user subsequently controls the avatar within the 3D environment and interacts with the items/objects therein in a manner that matches a previously set passcode then the user is authenticated.

It should be appreciated that the input unit 10 may comprise smart phones, tablet computers, portable or stand-alone computers, specialized computer systems, such as an ATM (automated teller machine), POS (point-of-sale) system, distributed computer systems, as well as combinations thereof and the like, which include the display 20, input device 40 and suitable processor 40 to enable a user to control an avatar within a 3D virtual environment. In addition, the authentication method disclosed herein may be used to provide secure access to the input unit 10 itself, or used to secure access to any application or content being executed or presented by the input unit 10. However, in other embodiments, the input unit 10, or the necessary portions thereof, may be configured to be retrofit with existing devices that would benefit from an additional level of authentication security that is provided by the 3D authentication method. For example, a bank safe may be retrofit with the input unit 10, so that access to the contents within the safe is restricted to only those individuals that can be authenticated using the 3D authentication method. Moreover, it should also be appreciated, that the 3D authentication method may be utilized, or the input unit 10 in which the 3D authentication method is carried out, may be used in any context where controlled or secure access to any digital or physical content(s), including but not limited to any item, area, device, system, data, application or the like, is to be limited to only an authorized person or party who has an authenticatable passcode.

Specifically, the processor 20 utilized by the input unit 10 may include any suitable computing device, which includes the hardware, software or combination thereof to execute the 3D authentication method disclosed herein. It should also be appreciated that the processor 20 may comprise a general purpose or application specific computing unit. In some embodiments the processor 20 may comprise a distributed computing unit.

The display 30 of the input unit 10 may comprise any suitable display that is capable of presenting three-dimensional (3D) images, such as the 3D environment. For example, the 3D display 30 may utilize any display technology, such as liquid crystal display (LCD) technology for example, and may use any suitable 3D rendering technology, such as active shutter 3D or naked-eye 3D for example. In some embodiments, the 3D display 30 may comprise a touch screen. In other embodiments, the 3D display 30 may be a projector capable of projecting 3D images onto a surface or into space, such as in the case of a hologram. In additional embodiments, the 3D display 30 may be a naked-eye 3D display, which does not require the user to wear or look through any glasses or lenses to view 3D images on the display 39. In further embodiments, the 3D display 30 may be configured as a virtual reality 3D display (i.e. stereoscopic display), which is able to present virtual reality (VR) 3D images. For example, the VR display may comprise any suitable head mounted display (HMD) that is worn by the user so that the display of the HMD encompasses the entire or partial field of view of the user. For example, the HMD in some embodiments may comprise that sold under the trademark Occulus Rift®. In still further embodiments, the 3D display 30 may be replaced with a two-dimensional (2D) enabled display, whereby the 3D environment is rendered by using suitable image shading and/or perspective techniques, or any suitable 3D depth cue, to give the appearance to the user that the environment is in three-dimensions.

The input device 40 may include any suitable device that allows the user to control the navigation and interaction of the avatar within the 3D environment presented on the display 30 based on the movement or operation of the input device 40 as controlled by the user. It should be appreciated that the avatar may comprise any icon, symbol, character, or any other virtual representation of any real or fictitious item, person or thing, that can be controlled by the input device 40 to navigate the 3D environment, and to interact with the various objects/items within such 3D environment. For example, the avatar may define a virtual person that has one or more individually controllable body portions, such as controllable arms or hands that can be specifically moved relative to the 3D environment. Furthermore, the input device 40 may include, but is not limited to: a touch screen interface, a direction pointer device, a stylus, a directional control pad, as well as combinations thereof and the like, which control the movement of the avatar within the 3D environment. In other embodiments, voice commands may be used to control movements of the avatar. Furthermore, in other embodiments, one or more motion tracking sensors or cameras, including those worn by the user or attached to the HMD, may act as the input device 40. For example, the motion tracking sensors or cameras may interpret the movement of one or more parts of the user's body, such as hands, arms, eyes, as well as facial expressions, gestures or the movement another object or item attached to or held by the user as control signals for controlling the movement and interaction of avatar with the 3D environment. It should be appreciated that the avatar may be presented on the display 30 so that the user has a first-person or a third-person perspective of the avatar as the avatar moves and interacts within the 3D environment. Thus, in some embodiments, the third-person avatar may be replaced with a first-person avatar. In further embodiments, a first-person avatar perspective may be utilized without any avatar, such that only the environment with relation to the user is shown on the display 30.

Thus, the processor 20, display 30, and input device 40 of the input unit 10 communicate together in order carry out the 3D authentication process to be discussed in detail below, using any suitable wired or wireless communication protocol, or combination thereof. It should be appreciated that while the processor 20, the display 30 and the input device 40 may be provided in a single unit, they may be discretely or separately arranged so that one or more of them are remotely located from the other by any desired distance. For example, the display 30 on which the interactive 3D environment is presented and the input device 40 that is used to control the movement and actions of the avatar within the 3D environment may be remotely located from the processor 20. In some embodiments, the input unit 10 may be configured to include the 3D display 30 and the input device 40, which are configured to be interfaced or retrofit with an existing processor that is part of or maintained by another device or system. For example, the 3D display 30 and the input device 40 may be retrofit or interfaced with a processor, such as by a wired or wireless input/output interface, of an existing POS (point-of-sale) or ATM (automated teller machine) system.

Figure 3:
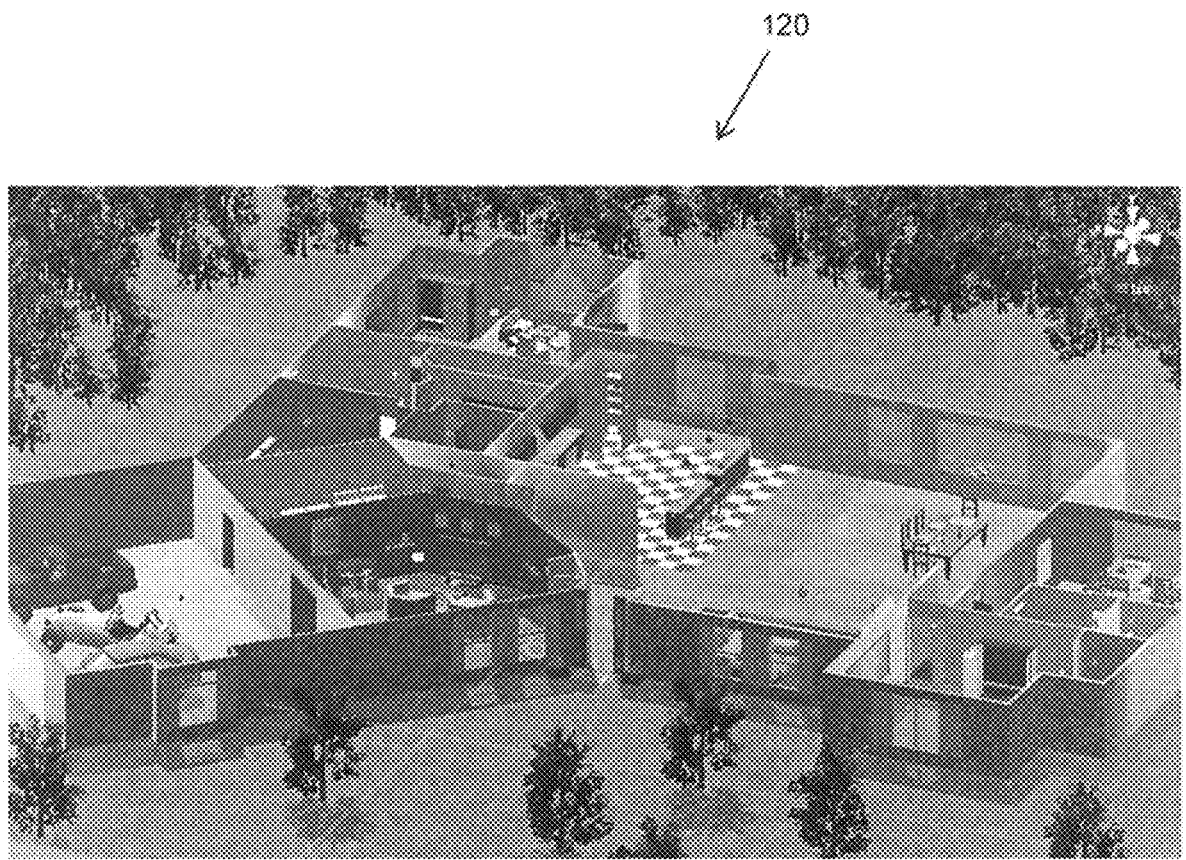
FIG. 3 is a perspective view of a 3D environment utilized the by 3D authentication method in accordance with the concepts of the various embodiments disclosed herein.

With regard to the 3D environment utilized by the 3D authentication method, it should be appreciated that such 3D environment may take on any design configuration, map, or layout, which includes one or more rooms, areas, spaces, terrain or the like, such as the 3D environment 120 shown in FIG. 3. For example, the 3D environment may be based on any environment, such as an indoor or outdoor environment, as well as environments from film, literature, images, actual locations, fictitious locations, and the like. It should be appreciated that in some embodiments, licensed films, images, and literature may be used as the 3D environment in exchange for a fee to generate advertising revenue.

In addition, because the 3D environment is a virtual computerized environment, such environment may be configured so that the avatar, or any portion thereof, may be controlled to navigate around the 3D environment in any desired manner, including but not limited to by: moving, walking, running, jumping, skipping, flying, floating, driving, warping from area to area, as well as combinations thereof and the like. In some embodiments, in lieu of controlling the avatar to navigate the 3D environment as part of the passcode, the movements of the avatar, or portions thereof, relative to the 3D environment may be used in conjunction with the avatar's interactions with objects/items to define the passcode.

The avatar is also configured to interact or perform actions on the objects/items in the 3D environment in any desired manner, including but not limited to: grasping, taking, moving, looking, touching, flipping, actuating, throwing, pushing, pulling, as well as combinations thereof and the like. It should also be appreciated that while direct interactions of the avatar on an item/object may be part of the passcode, indirect interactions on an item/object caused by the avatar may also be used as part of the passcode. For example, the avatar directly pushing a first object into a second object, results in a direct action of the avatar on the first object and an indirect action on the second object. It should be appreciated that the 3D environment presented by the 3D authentication method may utilize real-time, or near real-time, physics so that the navigation and physical interaction of the avatar with the objects and items in the 3D environment is carried out in a realistic manner.

Figure 2:
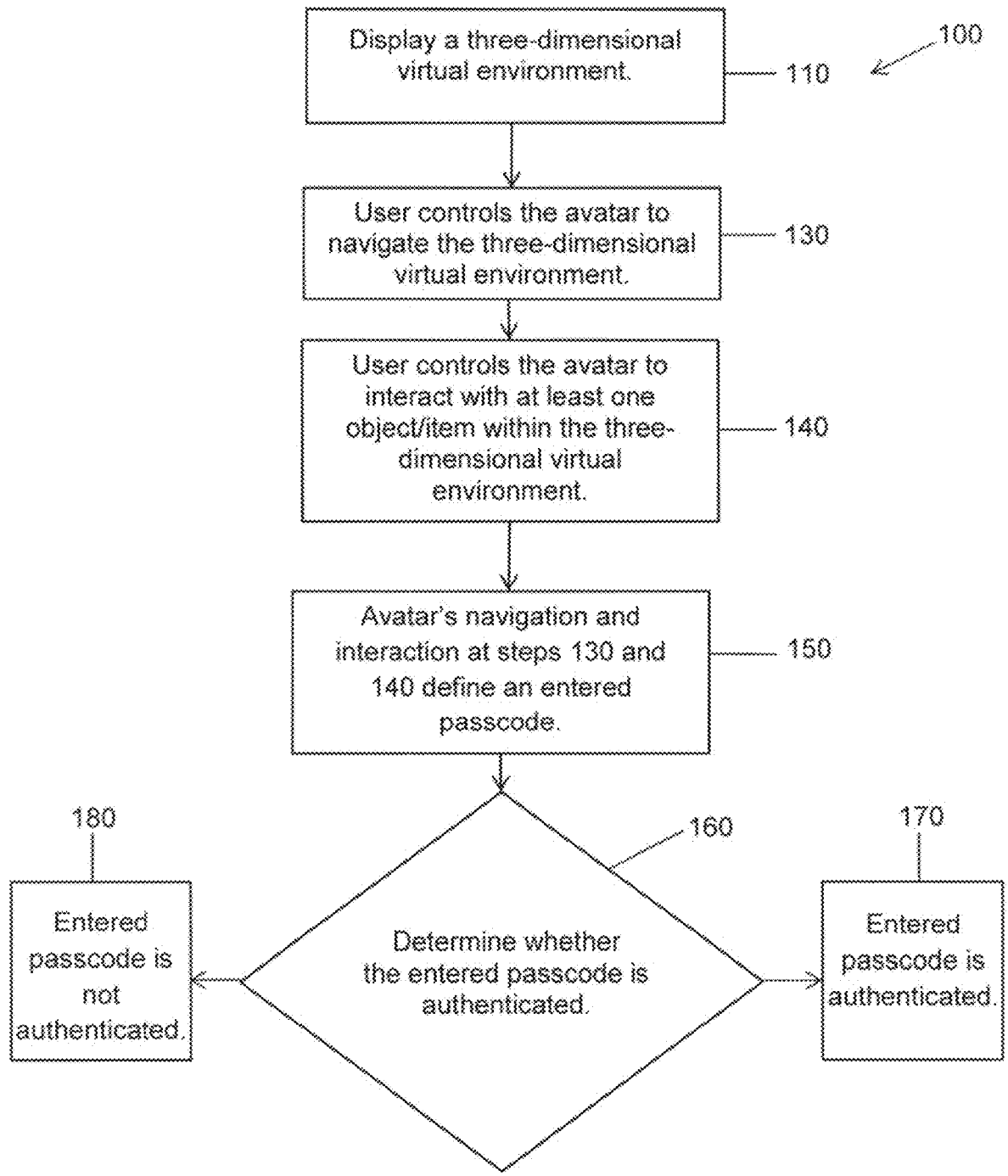
FIG. 2 is a flow diagram of the 3D authentication method in accordance with the concepts of the various embodiments disclosed herein.

With the components of the input unit 10 and the 3D environment 120 set forth, the operational steps, referred to by numeral 100, that are utilized by 3D authentication method to authenticate a user by an entered passcode are shown in FIG. 2. While the discussion herein refers to the authentication of the user of the passcode, it should also be interpreted to include the authentication of the passcode, itself, as well. Initially, to enter a user's passcode, the 3D environment 120 is presented on the 3D display 30, as indicated at step 110. It should be appreciated that the 3D environment 120, as previously discussed, is a virtual environment presented in three-dimensions when viewed by the user. The 3D environment 120 may include any number of areas, rooms or spaces, which are interconnected with each other so the avatar can navigate the environment as the user desires. Furthermore, within each area or room there may be one or more items or objects that the avatar is permitted to interact with.

Next, at step 130, the user navigates or moves the avatar through the 3D environment 120. For example, the navigation of the avatar may be performed by simply moving the avatar from one location to another in the environment. Thus, in the case of a free or open 3D environment, the avatar is free to navigate or move to any location in the environment. However, other 3D environments may require that the avatar navigates by moving between discrete or predetermined locations (in some embodiments, such locations may be displayed or hidden). Furthermore, in some embodiments, as previously discussed, the navigation step 130 may be replaced by a step in which a user moves the avatar, or portion thereof, relative to the 3D environment.

Continuing with the process 100, the user controls the avatar to interact with one or more of the items or objects within the 3D environment, as identified at step 140. It should be appreciated that steps 130,140 of navigating the avatar within the 3D environment, and interacting with one or more of the items/objects may be performed in any desired sequence, order, or combination. In some embodiments, process steps 130 and 140 may be performed concurrently with each other. In other embodiments only the interaction defines a passcode, or only the navigation defines a passcode. Furthermore, such steps 130,140 are performed one or more times, as desired by the user. As such, steps 130 and 140 may be performed so that one or more navigational moves are combined or mixed with one or more interactions with items/objects in any sequence or order. For example, steps 130 and 140 may be performed, so that the avatar: interacts with a toaster in the kitchen; navigates to the living room; interacts with a TV remote control; and navigates to the bedroom. As such, the particular combination of a user's control of the avatar to perform particular navigational movements and particular interactions with the items/objects at steps 130 and 140 defines the user's entered passcode, as set forth at step 150. Next, at step 160, the process 100 determines whether the user is authenticated based on the entered passcode. For example, in some embodiments at step 160, if the user navigates their avatar within the 3D environment and interacts with the items/objects in a way that generates an entered passcode that matches a previously set or stored passcode, the user/passcode is authenticated, as indicated at step 170. However, if the entered passcode does not match the previously set or stored passcode, the user/passcode is not authenticated, as indicated at step 180. It should be appreciated that other manners for carrying out the authentication process of the passcode at step 160 may also be utilized, such as by analyzing the passcode using fuzzy logic, or any other suitable analytical technique.

It should be appreciated that the 3D authentication method defines the passcode as a combination of the navigational movements of the avatar within the 3D environment and the interactions of the avatar with objects/items in the 3D environment. However, in some embodiments, the passcode may be defined by the navigational movements and the interactions with objects/items that occur in sequence (i.e. a continuous or linear path taken to each consecutive object/item). Although in other embodiments, the passcode may be defined by the sequence in which navigation to the objects/items occurred, and the particular interaction that is taken with respect to such object/items, without concern for the actual route taken to get to those objects (i.e. random or unstructured navigation to object/item). In yet further embodiments, the passcode may be generally defined as a behavior of the avatar based on the manner in which the avatar is controlled to navigate and interact with the 3D virtual environment and the objects/items contained therein. Such behavior defining the passcode may also be further defined using fuzzy logic or other suitable analytical technique.

To further illustrate the implementation of the 3D authentication method, the following discussion presents an exemplary embodiment for carrying out the 3D authentication method, and as such should not be construed as limiting. The 3D authentication method generates the 3D environment 120, as shown in FIG. 3, which is embodied as a virtual home or house for presentation on the 3D display 30. The virtual home may include a plurality of rooms that are interconnected in any desired manner. For example, the virtual home may include a one-story structure with a central loft area that includes a kitchen, dining room, and living room. Other rooms may be provided, such as a utility room and a garage, as well as bedrooms and a study that may branch out from the central area. The 3D virtual home environment includes various objects or items that may be interacted with by avatar controlled by the user via the input device 40. It should be appreciated that the objects and items may be placed in context appropriate locations in the virtual home. For example, the objects or items may include appliances and food items in the kitchen, couches and entertainment items in the living room, laundry items in the utility room, and cars in the garage. The user is permitted to move or navigate his or her avatar through the various rooms and interact with the various items therein as he or she desires using the input device 40.

As the user navigates his or her avatar through the 3D environment, the avatar may interact with the various items, such as by grasping, picking up, setting down, carrying, throwing, turning, dropping, moving, kicking, pushing, lifting, pulling, and the like, as well as combinations thereof. For example, the user may control the avatar to pick up and carry around books, fruit, silverware, or soap. Once an item/object is interacted with further actions on the item/object may be performed, such as by setting it down, dropping it, or throwing it, and the like. In addition, other items, including stationary items, may also be interacted with by the user's avatar. For example, a stove and a fireplace may be turned on and the flame provided thereby may be adjusted up or down or extinguished. Sinks and bathtubs may be filled with water or drained by interacting with their corresponding control knobs. Televisions may be turned on and flipped to one of a plurality of channels. Various lights about the virtual house may be turned on or off as desired.

In addition, containers, including drawers, cabinets, and refrigerators, are available in the various rooms of the virtual house of the 3D environment 120. Containers may be opened with precision for example, while a drawer can be opened halfway, or to any desired position between closed and open. Objects can be placed inside the containers, and when necessary, the objects may bind or become affixed to the container. For example, fruit placed in a bowl will bind or become affixed to the bowl, so the next time the bowl is picked up, both objects will travel together. This allows for indirect actions, such as placing one item or object in a container, such as the bowl, and then throwing the bowl, as a means of moving the original object from place to place.

Continuing with the example, objects and items that are desired to be interacted with may be targeted or identified by the input device 40 by a location dot, such as that provided by a pointer device. Thus, an object that is desired to be interacted with may be selected by moving the input device 40 to place a dot over the desired object. In some embodiments, the objects that are selected or targeted must be within reach of the avatar. Also in some embodiments, objects and items that are capable of being interacted with may be identified with a specific graphical identifier, such as a circle that is positioned above the object or item. In addition, objects or items that are currently selected by the user may be identified with another graphical identifier, such as a triangle positioned above the object or item. It should be appreciated that in some embodiments, a contextual menu may be presented on the display to identify the particular actions or interactions that can be taken with regard to a selected object or item. However, in other embodiments, no contextual menu may be provided.

As previously discussed, a user initially "sets" his or her passcode using the 3D authentication method by navigating his or her avatar within the 3D environment 120, combined with performing one or more actions or interactions with objects or items in the environment. That is, the 3D authentication system requires a user to initially set-up or define their passcode by performing one or more of navigational movements within the 3D environment in combination with performing one or more interactions with one or more objects or items. With respect to the exemplary environment described above, the user may set a passcode, against which subsequently entered or input passcodes are compared, by navigating his or her avatar within the 3D environment 120 so as to: 1.) enter the kitchen, whereupon the avatar is controlled to interact with the light switch to turn the lights on; 2.) enter the bedroom and turn on the lights and television therein; 3.) interact with a plate (such as by picking the plate up from the kitchen and taking it to the bedroom for example); and 4.) positioning the avatar so that it is by the couch in front of the TV in the bedroom, whereupon the avatar is controlled to rotate the plate until its angle matches the door to the left of the TV. As such, the sequence of the navigations/interactions, identified as steps 1-4 above that are performed by the avatar, define the passcode that is set, and which serves as the benchmark for comparison against other passcodes that are subsequently entered to authenticate the user. Accordingly, after the initial passcode is "set" users subsequently authenticate themselves by repeating the navigational movements and object/item interactions defining their "set" passcode, such as by repeating steps 1-4 as an entered passcode.

Therefore, one advantage of the embodiments of the 3D authentication method is that a virtual 3D environment can be chosen that is familiar to the user, such as a house or home. The use of a familiar environment allows for faster learning and remembrance of the set passcode, as the familiar environment gives context to the user so that they intuitively know what types of actions they may perform on objects/items in a particular room or location. For example, users know that in a house, there is a bathroom, with a sink that can be turned on and filled with running water. Thus, by matching user expectations, improvements in "presence" can be achieved, while facilitating faster learning of an environment for navigation purposes. And by making the 3D virtual environment familiar, users are able to focus on what makes the environment different from other similar environments that they have seen before (e.g. other houses), thus allowing users to form episodic memories and to establish context in the environment at a faster rate. For example, the 3D environment may be configured to have multiple distinct areas or rooms, such as rooms that have distinctly colored walls, distinctly patterned floors, or other distinguishing features so that users can establish a greater degree of context. Accordingly, passcodes generated by navigating the avatar in different contexts are able to be more resistant to memory interference, which is highly desirable.

Furthermore, the 3D environment based passcode utilized by the disclosed method improves usability because in some embodiments such 3D environments may be made compact or to have a small size, and is therefore easy and faster for the avatar to navigate across the furthest points of the 3D environment in a short amount of time, such as 15 seconds for example. To further enhance usability, some embodiments may be configured so that all doors between the rooms of the 3D environment may be left opened; while in other embodiments the doors may be left closed requiring user interaction to open or close them; and in further embodiments no doors may be provided. In other embodiments, a "speed navigation" function may be provided, allowing the avatar to navigate the 3D environment at an accelerated speed or pace through solid objects of the 3D environment to increase the speed at which the passcode is entered. For example, the entire 3D environment may be crossed in about 3 seconds in some embodiments. In still other embodiments, a transporter room or area may be provided as part of the 3D environment, which includes access points, doorways or ports that lead directly to other rooms or areas of the 3D environment, such as the bathroom, bedroom, kitchen, front door, dining room, for example. Thus, the transporter room allows the user to navigate directly from the transporter room to another room without having to navigate through any intervening rooms, thereby accelerating the speed of navigation within the 3D environment.

In addition, passcode usability is also enhanced by the 3D authentication method by leveraging a user's episodic memory and context-based memory through the understanding that humans navigate an environment by remembering its layout while also giving priority to landmarks when present. Thus, in some embodiments, the 3D authentication method is able to utilize landmarks within the 3D environment to improve navigation performance, as each room or area may be decorated or presented in a distinct way from other rooms or areas. In addition, in some embodiments, each room may have one or more distinct objects therein, such as a large screen television in the living room or a luxury car in the garage.

Therefore, it can be seen that the objects of the various embodiments disclosed herein have been satisfied by the structure and its method for use presented above. While in accordance with the Patent Statutes, only the best mode and preferred embodiments have been presented and described in detail, with it being understood that the embodiments disclosed herein are not limited thereto or thereby. Accordingly, for an appreciation of the true scope and breadth of the embodiments, reference should be made to the following claims.

What is claimed is:

1. An authentication method comprising:
   displaying a three-dimensional (3D) virtual environment including a plurality of discrete locations and a virtual icon;
   interacting said virtual icon with said environment,
   navigating said plurality of discrete locations with said virtual icon, such that said navigating and interacting of said virtual icon defines an entered passcode; and determining whether the entered passcode is authenticated.

2. The authentication method of claim 1, wherein said displaying step is performed by a display selected from a group consisting of a flat-panel display, a touch screen display, a virtual reality (VR) display, and a wearable display.

3. The authentication method of claim 1, wherein said environment is presented as a first-person image or a third-person image.

4. The authentication method of claim 1, wherein said interacting step includes a sequence of steps in which one or more virtual objects are controlled by said virtual icon.

5. The authentication method of claim 4, wherein said virtual objects are controlled to interact with one or more other virtual objects and/or to have modified properties.

6. The authentication method of claim 4, wherein at least one step in said sequence of steps is excluded from forming said entered passcode.

7. The authentication method of claim 1, wherein said interacting step is performed by controlling said virtual icon through the use of an input device selected from the group consisting of a touch screen interface, a keyboard, a direction pointer device, a stylus, a directional control pad, a camera, a motion tracking device or a voice recognition device.

8. The authentication method of claim 1, wherein said virtual icon is presented as a first-person image or a third-person image.

9. The authentication method of claim 1, wherein said environment is changed after a predetermined number of determining steps are performed.

10. A device for controlling access to content comprising:
    means for displaying a three-dimensional (3D) virtual environment including a plurality of discrete locations and a virtual icon;
    means for interacting said virtual icon with said environment
    means for navigating said plurality of discrete locations with said virtual icon such that said interacting and navigating defines an entered passcode; and
    means for determining whether said entered passcode is authenticated to determine if access to content controlled by the device is permitted.

11. The device of claim 10, wherein said means for displaying comprises a display selected from a group consisting of a flat-panel display, a touch screen display, a virtual reality (VR) display, and a wearable display.

12. The device of claim 10, wherein said environment is presented as a first-person image or a third-person image.

13. The authentication method of claim 12, wherein said interaction includes a sequence of steps in which one or more virtual objects within said virtual environment are controlled by said virtual icon.

14. The authentication method of claim 13, wherein said virtual objects are controlled to interact with one or more other virtual objects, and/or to have modified properties.

* * * * *